United States Patent [19]

Taketa et al.

[11] 4,001,648

[45] Jan. 4, 1977

[54] GROUND FAULT DETECTOR

[75] Inventors: Katsumi Taketa; Hirotoshi Nitta; Eiichi Sato, all of Fukuyama, Japan

[73] Assignee: Mitsubishi Denki Kabushiki Kaisha, Japan

[22] Filed: Nov. 5, 1975

[21] Appl. No.: 629,626

Related U.S. Application Data

[63] Continuation of Ser. No. 468,150, May 8, 1974, abandoned.

[30] Foreign Application Priority Data

May 19, 1973  Japan ............................ 48-56181

[52] U.S. Cl. ............................... 317/18 D; 317/38
[51] Int. Cl.² ........................................ H02H 3/30
[58] Field of Search ............... 317/17, 18 R, 18 D, 317/36 TD, 38; 340/253 H, 253 N

[56] References Cited

UNITED STATES PATENTS

| 3,105,920 | 10/1963 | Dewey | 317/36 TD |
| 3,132,287 | 5/1964 | Yarbrough | 317/38 |
| 3,733,517 | 5/1973 | Wilson | 317/18 D |
| 3,809,962 | 5/1974 | Brown et al. | 317/18 D |

Primary Examiner—Harry Moose
Attorney, Agent, or Firm—Robert E. Burns; Emmanuel J. Lobato; Bruce L. Adams

[57] ABSTRACT

A zero phase-sequence current transformer responds to a ground fault occurring in a distribution line to produce an output. With the ground-fault current low, the output increases gradually a charged voltage across a capacitor to a predetermined magnitude through a high resistor. At that time a thyristor is turned on by a constant voltage element to open the associated circuit breaker. With the ground-fault current high, the output from the transformer breaks down a Zener diode to immediately charge the capacitor to turn the thyristor on, resulting in the opening of the circuit interrupter.

2 Claims, 3 Drawing Figures

GROUND FAULT DETECTOR

This is a continuation of application Ser. No. 468,150, filed May 8, 1974, now abandoned.

BACKGROUND OF THE INVENTION

This invention relates to improvements in a ground-fault detector for detecting ground-fault currents flowing through a power distribution line by means of a zero phase-sequence current transformer.

Conventional ground-fault detector of the type referred to could be prevented from performing malfunction due to surges or noise by having the considerably high resistor and/or capacitor for absorbing the surges or noise. This has led to an increase in a time constant involved to impede the high speed operation of the ground-fault detector required for preventing electric shocks so that a high ground-fault current may flow through the human body for a long time. Therefore a danger may occur that a person or persons would be caused to die.

SUMMARY OF THE INVENTION

Accordingly it is an object of the present invention to provide a new and improved ground-fault detector with a high sensitivity free from malfunction due to surges or noise occurring in the associated power distribution line and ensuring that a person or persons can be effectively prevented from receiving electric shocks.

The present invention accomplishes this object by the provision of a ground fault detector device comprising a zero phase-sequence current transformer electrically connected to an electric path to detect a ground-fault current flowing through the latter to provide an output, a semiconductor switching element responsive to the output from the zero phase-sequence current transformer to be conducting thereby to trip a circuit interrupter connected in the electric path to open said electric path, and circuit means including a resistor having a relatively high magnitude of resistance, a capacitor serially connected to the resistor and a constant voltage element connected across the resistor, the circuit means responding to the output from the current transformer less than a predetermined magnitude to gradually increase a potential at the capacitor through the resistor to a predetermined magnitude whereupon the semiconductor switching element is put in its conducting state, the circuit means responding to the output from the current transformer in excess of the first-mentioned predetermined magnitude to instantaneously increase a potential at the capacitor through the constant voltage element to put the semiconductor switching element in its conducting state.

In a preferred embodiment of the present invention, the ground-fault detector device may comprise, in combination, a zero phase-sequence current transformer electrically connected in an electric path and including a secondary winding, a first resistor connected to the secondary winding of the zero phase-sequence current transformer, a capacitor serially connected to the first resistor, a constant voltage element connected across the first resistor, a first switching element responsive to a predetermined magnitude of a charged voltage across the capacitor to be conducting, a second switching element responsive to the conduction of the first switching element to be conducting, and electromagnetic means responsive to the conduction of the second switching element to be energized, the electromagnetic means being operated, when energized, to open a circuit interrupter connected in the electric path thereby to open the latter.

BRIEF DESCRIPTION OF THE DRAWING

The present invention will become more readily apparent from the following detailed description taken in conjunction with the accompanying drawing in which.

DESCRIPTION OF THE PREFERRED EMBODIMENT

Figure 1:
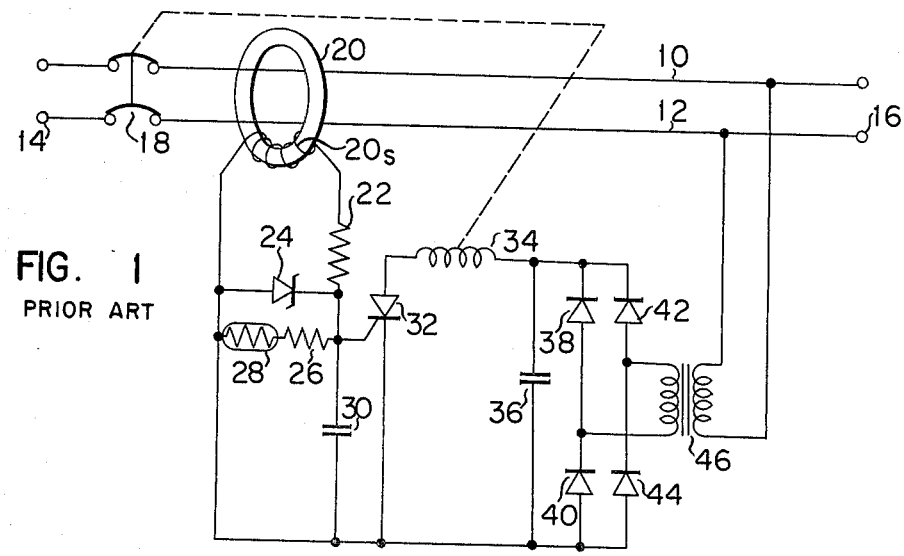
FIG. 1 is a circuit diagram of a ground-fault detector constructed in accordance with the principles of the prior art.

Referring now to the drawing and FIG. 1 in particular, it is seen that an arrangement disclosed herein comprises a section of a power distribution line including a pair of line conductors 10 and 12 terminating at terminals 14 and 16 and having connected therein a normally closed circuit interrupter 18, and a zero phase sequence current transformer 20 inductively coupled to the line conductors 10 and 12. The current transformer 20 includes a primary winding formed of the line conductors 10 and 12 and a secondary winding 20S connected through an adjusting resistor 22 across a Zener diode 24 subsequently connected across a series combination of a temperature compensation resistor 26 and a thermistor 28. The series combination of the resistor and thermistor 26 and 28 respectively is connected across a capacitor 30 adapted to cooperated with the resistor 22 to absorb any surge developed in the distribution line. The resistor 26 is also connected to a gate electrode of a thyristor 32 including a cathode electrode connected to the junction of the capacitor and thermistor 30 and 28 respectively, and an anode electrode connected to an electromagnetic trip device 34 for the circuit interrupter 20. The trip device 34 is connected to the cathode electrode of the thyristor 32 through a combined absorbing and smoothing capacitor 36 and also to one output of a bridge type rectifier formed of four semiconductor rectifying diodes 38, 40, 42 and 44. The rectifier includes the other output connected to the cathode electrode of the thyristor 32 and a pair of inputs or the junction of the diodes 38 and 40 and the junction of the diodes 42 and 44 are connected across a secondary winding of a transformer 46. The transformer 46 includes a primary winding connected across the conductors 10 and 12.

With the distribution line maintained in the normal mode of operation in which no ground-fault current flows through the line, respective phases for the line conductors 10 and 12 extending through the zero phase-sequence current transformer 20 are maintained balanced and therefore no output is produced across the secondary transformer winding 20S. If a line-to-ground fault, for example, a fault imparting a considerable shock to the human body occurs then a zero phase-sequence current flows through the conductor 10 or 12 to induce an output across the secondary transformer winding 20S. The output from the current transformer 20 applies a gate signal to the gate electrode of the thyristor 32 to turn the thyristor on. This permits the electromagnetic trip device 34 to be driven with a power supplied from the conductors 10 and 12 through the transformer 46 and the rectifier 38-40-42-44 resulting in the opening of the circuit interrupter 18 and therefore of the distribution conductors 10 and 12.

Figure 3:
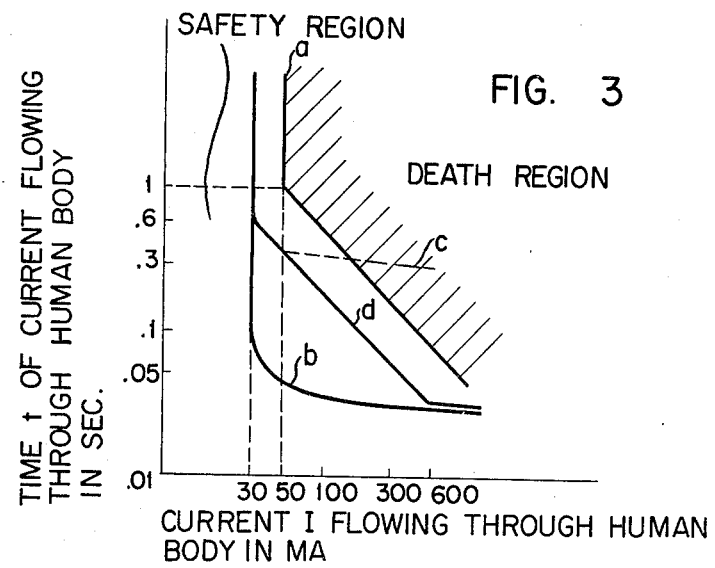
FIG. 3 is a graph useful in explaining the operating characteristics of ground-fault detectors.

The arrangement as above described has its operating characteristic such as shown at curve b in FIG. 3 wherein the axis of abscissas represents current flowing through the human body in milliamperes and the axis of ordinates represents a time for which the current flows through the human body in seconds. In conventional ground-fault detector devices such as shown in FIG. 1, any surge or noise entered thereinto through the zero phase sequence current transformer 20 has been adapted to be absorbed by the resistor capacitor and Zener diode 22, 30 and 24 respectively whereby the device is prevented from performing malfunction. In order to sufficiently absorb such a surge or noise to prevent malfunction, it is required to impart a considerably high magnitude of resistance to the resistor 22. Alternatively the capacitor 30 must have a considerably high capacitance. The higher the magnitude of resistance or capacitance the longer the associated time constant. This impedes the feature of ground-fault detector devices that the high speed operation should be performed in order to prevent electric shocks. Therefore a fear may occur that the devices will fail to perform the proper operation. The ground-fault detector devices thus impeded in the feature may have the characteristic such as shown at curve c in FIG. 3.

On the other hand, the human body has an electricity resisting property such as shown at curve a in FIG. 3. From curve a it is seen that, with a low current I flowing through the human body, a time t of flow of the current may be long. On the contrary, if the current I flowing through the human body is high then a time of flow of the current must be short. In FIG. 3, the hatched portion defined by curve a designates the death region and the safety region is also shown. As above described, the conventional device as shown in FIG. 1 has had the characteristic such as shown at curve c in FIG. 3. That is, a high current flowing through a person may cause him or her to die because the current flows through the person for a long time.

The present invention contemplates to eliminate the disadvantages of the prior art type devices as above described, in consideration of the electricity resisting property of the human body as above described.

The present invention provides a ground-fault detector device designed and constructed such that with a ground-fault current relatively low, a trigger signal is applied to a switching element such as a thyristor through a time constant circuit having a large time constant while, with a ground-fault current high, a trigger signal is instantaneously applied to the switching element through a circuit disposed separately from the time constant circuit.

Figure 2:
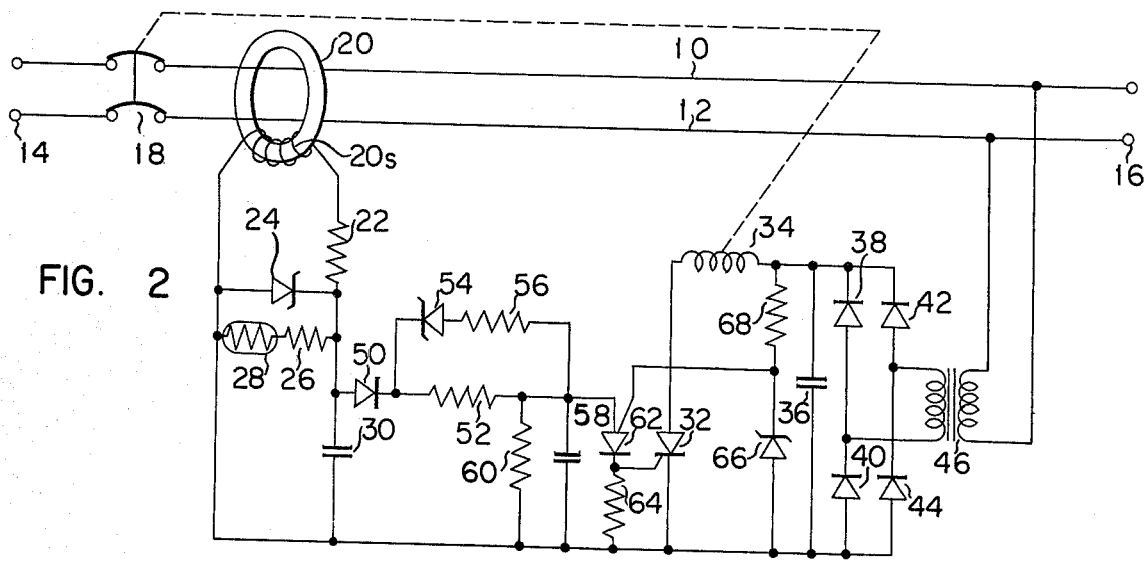
FIG. 2 is a circuit diagram of a ground-fault detector constructed in accordance with the principles of the present invention.

Referring now to FIG. 2 wherein like reference numerals designate the components corresponding or similar to those shown in FIG. 1, there is illustrated one embodiment of the present invention. In the arrangement illustrated, the junction of the resistor and capacitor 26 and 30 respectively for absorbing surges or noise is connected to a semiconductor diode 50 for preventing a flow of reverse current. The diode 50 includes a cathode electrode connected to a current limiting resistor 52 and also to a cathode electrode of a Zener diode 54 connected at the anode electrode to a current limiting resistor 56. The resistor 56 is connected to a capacitor 58 subsequently connected to the capacitor 30 and also having a resistor 60 connected thereacross. The resistor 56 is very smaller in a magnitude of resistance than the resistor 52 and forms a time constant circuit having a small time constant along with the capacitor 58 and the Zener diode 54. On the other hand, the resistor 52 forms another time constant circuit having a large time constant along with the capacitor 58. The resistor 60 serves as a discharging resistor for the capacitor 58.

The capacitor 58 is connected across an N type gate thyristor 62 through a resistor 64. Then the junction of the cathode electrode of the thyristor 62 and the resistor 64 is connected to the gate electrode of the thyristor 32 and the thyristor 62 includes a gate electrode connected to the junction of a Zener diode 66 and a resistor 68. The Zener diode and resistor 66 and 68 respectively form a constant voltage circuit connected across a series combination of the electromagnetic trip device and thyristor 34 and 32 respectively and also across the capacitor 36.

In other respects, the arrangement of FIG. 2 is identical to that shown in FIG. 1.

If a surge or noise caused on the distribution conductors 10 or 12 enters the ground-fault detector device through the zero phase-sequence current transformer 20 then the device can be prevented from performing malfunction because the resistor 52 has a sufficiently high magnitude of resistance, for example, equal to about twenty time the magnitude of resistance of the resistor 56.

If a line-to-ground fault occurs to cause a flow of low ground-fault current through the distribution conductors 10 and 12 then the Zener diode 54 remains in its nonconducting state. This permits the output from the zero phase-sequence current transformer 20 to be gradually accumulated on the capacitor 58 through the diode and resistor 50 and 52 respectively to increase a potential thereat. When the potential at the capacitor 58 exceeds a gate voltage for the N gate thyristor 62, the latter is turned on to apply a trigger signal to the thyristor 32. Thus the thyristor 32 is driven in the conducting state. As in the arrangement of FIG. 1, the conduction of the thyristor 32 results in the opening of the circuit interrupter 18 through the electromagnetic trip device 34.

A time interval starting with the occurrence of the line-to-ground fault and terminating at the opening of the circuit interrupter 18 is relatively long because it is determined by the relatively large time constant provided by the resistor and the capacitor 52 and 58 respectively. However, the ground fault does not endanger the human body because the resulting ground-fault current is low.

On the contrary, if a ground-fault current is high then the Zener diode 54 is immediately conducting to short circuit the resistor 52 with the resistor 56. Therefore the output from the Zero phase-sequence current transformer 20 is instantaneously supplied to the capacitor 58 to instantaneously increase the potential thereat resulting in the thyristor 32 being triggered to its conducting state. In other words, the occurrence of a high ground-fault current causes the break-over of the Zener diode 54 to form a smaller time constant circuit whereby the circuit interrupter 18 is instantaneously opened. Thus it will be appreciated that the arrangement of FIG. 2 has a inverse time-limit characteristic such as shown at curve *d* in FIG. 3. Accordingly any ground fault resulting in a flow of high fault current does not at all endanger the human body.

From the foregoing it will be appreciated that present invention has provided a ground-fault detector device effectively prevented from performing malfunction due to surges and noise occurring in the associated distribution line and ensuring that persons can be prevented from receiving electric shocks as compared with conventional ground-fault detectors high in both sensitivity and response.

While the present invention has been illustrated and described in conjunction with a single preferred embodiment thereof it is to be understood that numerous changes and modification may be resorted to without departing from the spirit and scope of the present invention.

What we claim is:

1. A ground fault detector device comprising:
a zero phase-sequence current transformer, electrically connected to an electric circuit path which includes an electrically energized circuit interrupter, to detect a ground fault current flowing through the electric circuit path to provide an output current in response to the fault current; a half-wave rectifier for rectifying the output current from said transformer; a semiconductor switching element rendered conductive in response to said half-wave rectified output current from said zero phase-sequence current transformer; electromagnetic circuit means energized by a voltage in said electric path and responsive to the conduction of said semiconductor switching element to energize said circuit interrupter connected in said electric path to open said electric path; and circuit means including a resistor having a relatively high magnitude of resistance, a capacitor connected in cascade with said resistor and a constant voltage element having a voltage dependent impedance connected across said resistor, said circuit means applying through said resistor the half-wave rectified output current from said current transformer less than a predetermined magnitude to gradually increase a potential across said capacitor to a predetermined magnitude whereupon said semiconductor switching element is put in its conducting state to energize said circuit interrupter, said constant voltage element responding to the half-wave rectified output current from said current transformer in excess of the first-mentioned predetermined magnitude to instantaneously increase the current flowing to said capacitor to put said semiconductor switching element in its conducting state.

2. A ground fault detector device comprising, in combination, a zero phase-sequence current transformer electrically connected to an electric path, having a electrically energized circuit interrupter, and including a secondary winding; a half-wave rectifier; a first resistor connected to said secondary winding of said zero phase-sequence current transformer through said half-wave rectifier; a capacitor connected in cascade with said first resistor; a constant voltage element having a voltage dependent impedance connected across said first resistor; a first switching element responsive to a predetermined magnitude of a charged voltage across said capacitor to conduct; a second switching element responsive to the conduction of said first switching element to conduct; and electromagnetic means responsive to the conduction of said second switching element and cooperative with said electric path to energize said circuit interrupter.

* * * * *